April 7, 1953            A. G. BROWN            2,633,819

PERCENTAGE REGISTERING DEVICE

Filed Oct. 30, 1950            2 SHEETS—SHEET 1

Inventor
Andrew G. Brown
by W. Bartlett Jones,
Attorney

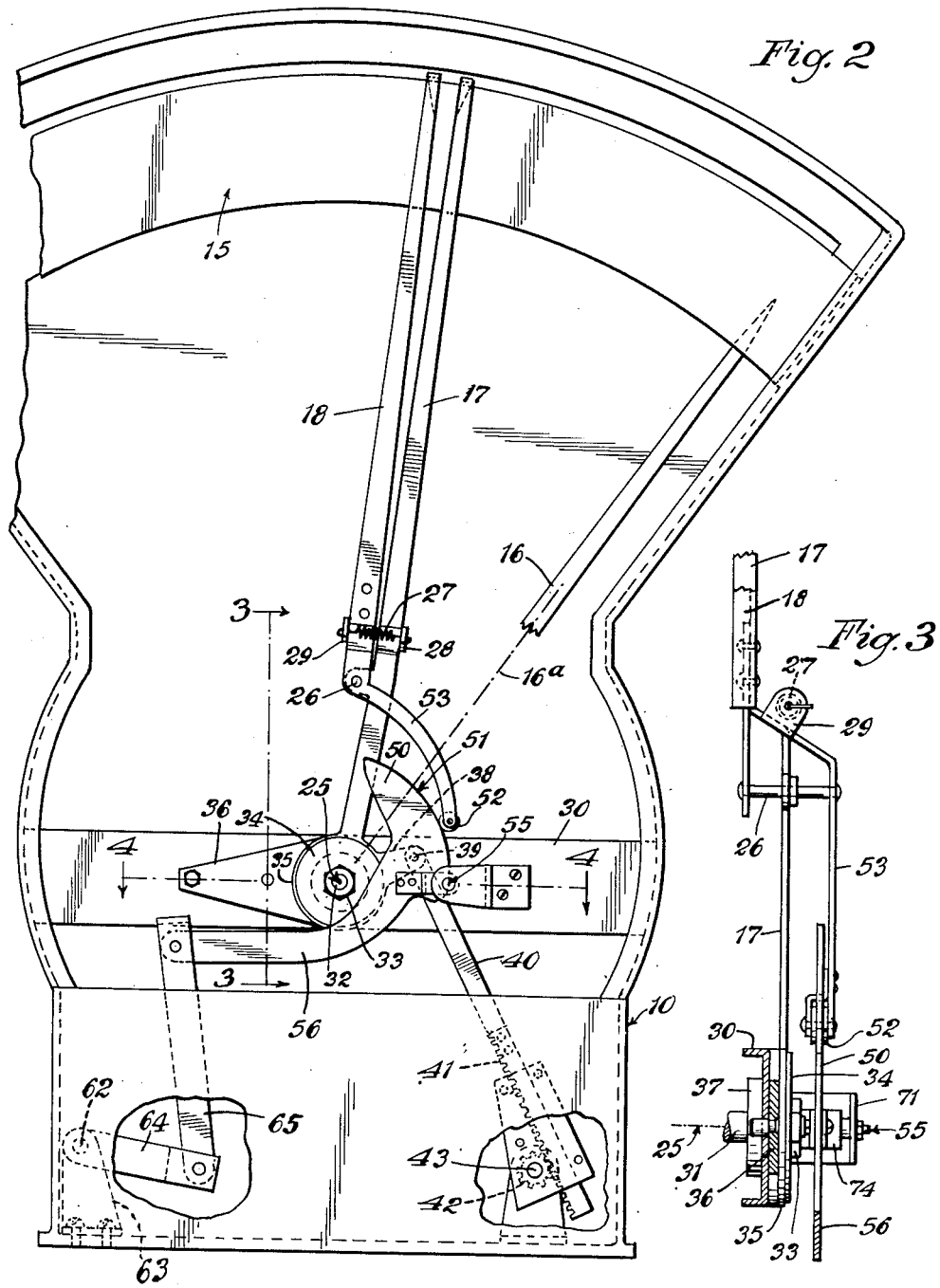

Patented Apr. 7, 1953

2,633,819

UNITED STATES PATENT OFFICE 2,633,819

PERCENTAGE REGISTERING DEVICE

Andrew G. Brown, Maywood, Ill., assignor to The Griffith Laboratories, Inc., Chicago, Ill., a corporation of Illinois Application October 30, 1950, Serial No. 192,979

3 Claims. (Cl. 116—129)

The present invention relates to weighing scales and in particular to percentage scales.

Heretofore, scales have been provided with separable registering indicators, in particular a true-weight indicator to register an actual weight and a percentage indicator to register a given percentage of that weight. The said true-weight indicator may be actuated either by the load being weighed, or manually to coincide with the registration of the conventional indicator which is actuated by the load being weighed. As incorporated in scales for pickling hams, the percentage indicator is arranged for operation to show a given percentage increase over the ham weight registered by the true-weight indicator. Such a scale is useful to permit injecting a predetermined quantity of pickling brine into a ham in proportion to the weight of the ham.

In the U. S. Jones Patent No. 2,157,705 a true-weight indicator which is actuated by the load carries an auxiliary indicator pivoted to it to provide an angular separation between the two, such that the separated tips or other appropriate regions of the indicators comprehend on the scale dial a percentage of the load weight. Because the addition of brine to the ham causes the percentage indicator to move, a manually movable marker is employed to record the goal to which the weight of the ham is to be increased by adding brine. The auxiliary indicator is moved relative to the true-weight indicator by a cam having a contour designed to effect the proper registration. Thus, in scales having a non-uniformly calibrated weight scale or dial, the cam is specially designed for its requirements. In said patent, however, the dial is uniformly calibrated so that over the range required for pickling hams, the cam may be shifted to different positions on a pivotal axis corresponding to a calibrated adjustment to register different percentages. A difficulty with the particular construction shown in that patent is the apparent inaccuracy of percentage functioning at the zero weights and weights near the zero position for the various percentage adjustments permitted by the construction.

In U. S. Jones Patent No. 2,157,706 this difficulty of registration at zero was overcome by providing different cams for each percentage for which it is desired to operate the scale. A defect of the second Jones patent lies in the fixed percentages to which the scale may be adjusted, thus minimizing the flexibility of the scale for percentage uses.

It is the object of the present invention to provide a simplified percentage scale having a wide range of adjustments for percentage use, and the ability to function as a percentage scale over the whole range of the dial upwardly from zero, and especially at zero registration.

A particular object of the invention is to provide a single cam such that it may be adjustably positioned for varying the percentage registered, with substantially accurate functioning particularly at and near the zero position.

Various other and ancillary objects and advantages of the invention will become apparent from the following description and explanation of the invention as illustrated in the accompanying drawings, in which:

Fig. 2 shows a rear view of said scale with its back panel removed to illustrate the relationship of various parts.

Fig. 3 is a fragmentary detailed vertical cross-sectional view taken on the line 3—3 of Fig. 2 showing the mounting of the two separable indicators.

It is to be understood that the invention is not limited to or by the embodiment illustrated and described. One of the important uses for percentage scales is for pickling hams, but it is to be understood that the invention is not limited to this field, and that modifications and refinements in structure, involving the present invention and other features of the illustrated scale may be made for other uses.

Figure 1:
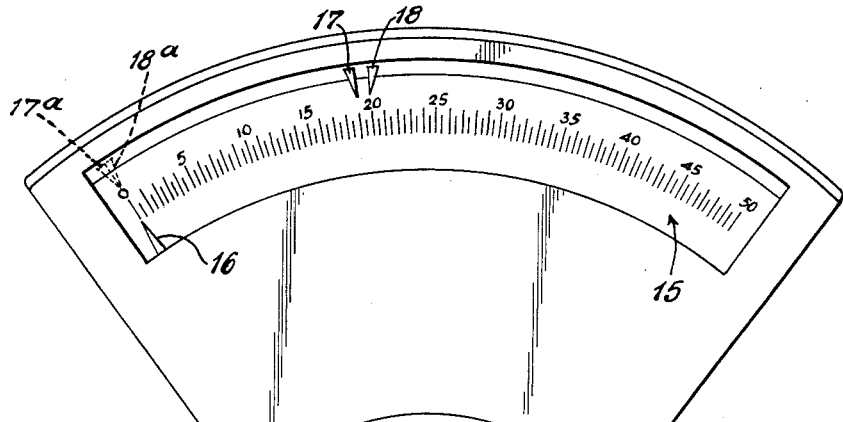
Fig. 1 shows a front view of a scale embodying the invention in a form particularly useful in a meat packing plant for pickling hams.

In Fig. 1, numeral 10 designates a scale base with a movable over-hanging platform 11 inclined to one side as a drainboard for carrying off spilled pickle. Above platform 11 is a grid of bars 12 on which is placed a ham to be pickled. The platform 11 has a vertical rear splash board 13 to protect the scale mechanism from contact with brine. The scale illustrated has a fan dial 15 uniformly calibrated, over which the conventional load bearing indicator 16 moves to the right from zero position. For percentage functioning there is a true-weight indicator 17 and a percentage indicator 18 which separate as they move together to the right over dial 15 from non-separated positions 17a and 18a at zero registration. At the front panel 20 of scale base 10, there is a knob 21 to be turned to move true-weight indicator 17 to any position along the dial 15. Also on said panel is a percentage adjusting knob 22 with calibrations 23 indicating the setting for a predetermined percentage when a chosen calibration is positioned against fixed point 24 on the front panel 20.

The functions of the parts above described are to be found in the said two Jones patents, but as operative therein, a difficulty is presented at every adjustment of the percentage control knob 22. The two indicators 17 and 18 at zero true-weight registration must not move or separate. Although it is not practicable to use a percentage scale as such for loads very close to the zero position on its dial, it is very important that there be no separation of the indicators 17 and 18 at zero position. Any such separation at zero position leads the user of the scale, who may not know or appreciate the accuracy of the scale over the dial away from zero, to believe that the separation is a constant error, or an imperfection, or a condition of improper adjustment. In consequence, the operator may be led to correct the upper and actual readings mentally to compensate for such believed error, with the result that the work required is incorrectly accomplished.

The present invention provides a construction assuring no separation of the two indicators of the percentage mechanism at zero position for every operating percentage for which the scale may be set. The invention uses the single pivoted cam of the Jones Patent No. 2,157,705 with modifications which constitute the present invention. The change involves passage of the cam contour through the pivotal axis of the adjustable cam, and the location of the cam rider for contact with the cam contour substantially at the cam axis for zero positions of the percentage mechanism.

In Fig. 2 the three indicators 16, 17 and 18 are shown as long arms at the rear of the scale. Load indicator 16 turns on axis 25 as does arm 17. Arm 18 is carried by arm 17 on a pivot 26, and the two arms are drawn together by tension spring 27 between ear 28 on arm 17 and ear 29 on arm 18. Since there is no mechanical functional relation between the movement of load indicator 16 and true-weight indicator 17, even though they are co-axial, the needle 16 is broken off and is represented by dotted line 16a as it is actually extended and mounted to move about the axis 25.

The true-weight indicator 17 is moved manually by operation of the front knob 21 by any suitable mechanism. Across the rear of the scale (Fig. 2) is a mounting bar plate 30 in which is mounted a fixed shaft 31 (Fig. 4) on center 25. Shaft 31 has a reduced threaded end 32 on which nut 33 is threaded against a friction washer 34 positioned to bear upon a collar portion 35 co-axial on center 25 and integral with the true-weight indicator arm 17. Collar 35 rests upon a spacer plate 36 secured to bar plate 30. Collar 35 and plate 36 are apertured for an axial stud 37 on which collar 35 turns when knob 21 is turned. The collar 35 has an arm 38 at the end of which there is pivotal connection at 39 to link 40. The link 40 has rack teeth 41 engaging pinion 42 rigid on a shaft 43 which extends to the front panel 20 of the scale and there carries control knob 21.

The percentage indicator 18 is cammed away from the true-weight indicator 17 against the force of tension spring 27. For this purpose, a cam 50 is provided having a cam contour or line 51 lying in a plane, which contour passes through the axis on which the cam body turns in its adjustment. A cam rider for the cam contour is so constructed that it effects registration of both indicators 17 and 18 substantially at zero, within ordinary limits of observation, for all adjustments of the cam. Where a roller is employed as the cam rider, which is a mechanical expedient to minimize wear, its radius is small relative to the radius of curvature of the cam contour at its axis. This is exemplified by a cam roller 52 on the end of an arm 53 which is rigid with the indicator 18 and at an angle thereto. The cam 50 is pivotally mounted to the bar plate 30 on an axis 55 which is normal to the plane of said cam line or contour 51. However, the cam is so mounted that the cam line 51 passes through the said pivotal axis 55. Cam 50 has an integral arm 56 extending to the left in Fig. 2 for the purpose of moving the cam pivotally about its axis 55 by operating the adjusting knob 22 on the front panel 20 of the scale 10.

The knob 22 is rigid with a pinion 60 which meshes with a gear segment 61 carried within the scale base by shaft 62 which runs from the front panel 20 to the rear of the scale where the shaft 62 bears in bracket 63. Near the bracket the shaft 62 has a rigid arm 64 connected by a pivoted link 65 to the cam arm 56.

Figure 4:
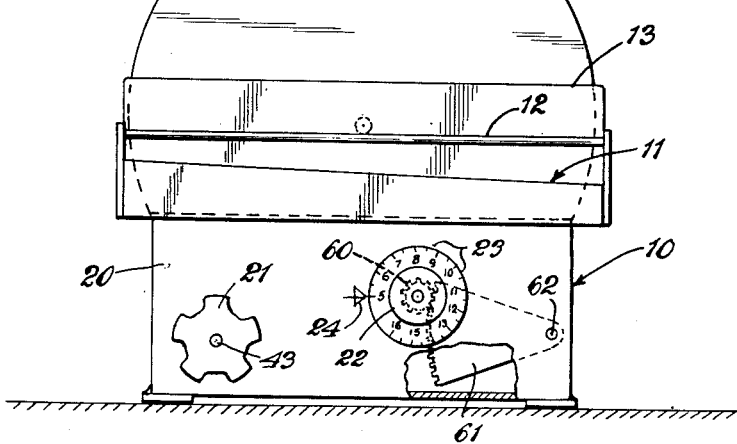
Fig. 4 is a detailed cross-sectional view on a horizontal plane taken on the line 4—4 of Fig. 2 showing the manner of mounting the indicators.

Fig. 4 shows one manner of mounting the cam 50 so as to permit its cam line 51 to pass through and be available at the pivotal axis 55. Bar plate 30 has two spaced brackets 70 and 71 secured to it between and to which is mounted the cam 50. Two forking mounting ears 73 and 74 are secured to the cam 50 and these are co-axially pivoted on the axis 55, to ears 71 and 72 by the illustrated pivot 75 between bracket 70 and ear 73 and pivot 76 between bracket 71 and ear 74.

In Fig. 2 the cam-riding roller 52 is illustrated in an upward position on the cam 50 because the indicator 17 is at an upward position on the dial 15 and away from the zero point thereon. In this setting, if the percentage control knob 22 is moved counter-clockwise as viewed in Fig. 1 in order to increase the percentage to be registered, the cam 50 will turn clockwise on its axis as viewed in Fig. 2. This will move the cam roller 52 to effect a greater separation of the indicators 17 and 18 by moving indicator 18 relative to stationary indicator 17. If the cammed roller 52 were in contact with the cam 50 at the cam axis 55 as it is when the indicator 17 registers zero, the cam may be moved freely to any adjustment for percentage without moving the cam roller at all. The registering tips of the indicator 17 and 18 are in contact at zero position as shown at 17a and 18a in Fig. 1 and it is at this position that the cam roller 52 contacts the cam substantially at the cam axis 55 as designated in Fig. 5 by the numeral 52a for the roller and 53a for its carrying arm.

Figure 5:
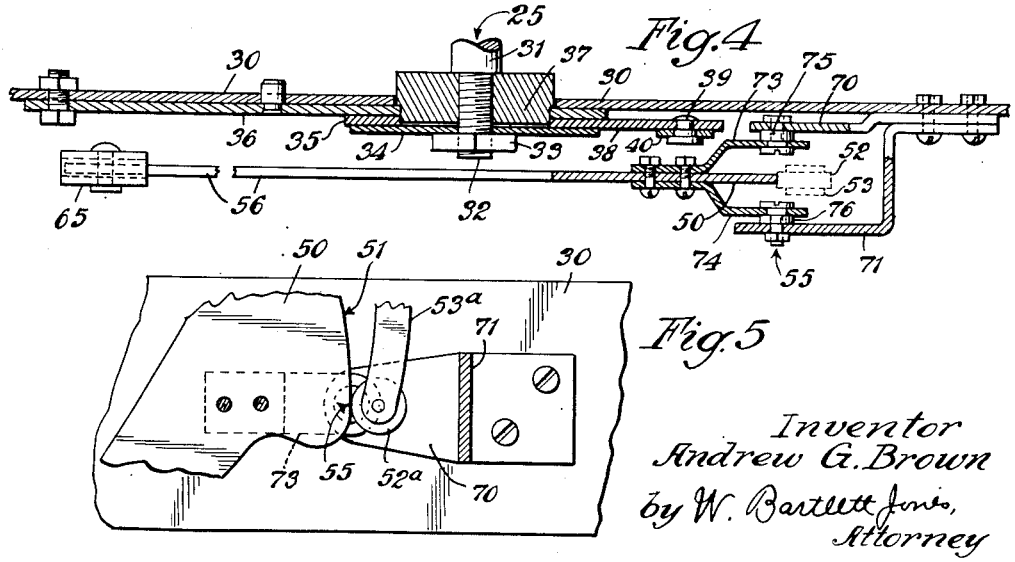
Fig. 5 is a detailed enlarged view of a portion of the cam with its cam-rider as positioned at zero registration.

In Fig. 5 it is clear that there is only one position of cam 50 at which the point of tangency of cam line 51 and of the periphery of cam roller 52a coincides with the cam axis 55. In varying the setting of the cam the departure from coincidence is of such small extent that deviation on the registering dial is not observable, considering also the mechanical play in the moving parts and the tensioning action of spring 27.

In practical use of the scale described, the percentage mechanism is entirely independent of the weighing mechanism, including the latter's indicator 16. The two knobs at the front panel of the scale relate only to the percentage mechanism. By turning the knob 21, the indicators 17 and 18 may be brought each to register substantially at zero and from there moved upwardly along dial 15 with increasing separation according to the percentage for which the scale is set at the adjusting knob 22. With the true-weight indicator 17 in any position upwardly on the scale from zero, as predetermined by the position of knob 21, the percentage adjustment knob 22 may be turned without effecting any movement of the indicator 17. The only movement effected is rotation of the cam which, in turn, causes the indicator 18 to position itself with respect to indicator 17 to register the percentage increase corresponding to the adjustment of knob 22. Thus, at every position on the dial away from zero, movement of the knob 22 changes the separation of the indicators 17 and 18, but at position zero substantially no motion is effected and the adjusting knob 22 may be turned without visible effect. This construction assures closed positions of the two indicators at zero registration and avoids any separation by reason of mechanical imperfection at this location, which separation might erroneously be construed as requiring a correction of the reading at other parts of the scale.

It is to be understood that the invention is not limited to the embodiment herein shown and described, and that changes and modifications are contemplated as falling within the scope of the appended claims.

I claim:

1. A percentage scale having in combination a frame, a calibrated dial, a movable true-weight indicator registering on said dial, a movable percentage indicator biased to register on said dial a predetermined percentage of the registration of the true-weight indicator on said dial whereby said two indicators move apart as they progress upwardly along said calibrated dial, a cam having a contour and a position controlling the separation of the said two indicators, a cam-riding portion carried by one of said indicators and movable to predetermine the separation of said two indicators, said cam being adjustably movable about a pivotal axis fixed relative to said frame for setting the cam for different percentages of separation, said cam having its cam-ridden contour passing through its said pivotal axis, and said cam-riding portion at the zero position of the true-weight indicator having contact with said cam contour substantially at said pivotal axis, whereby at each position of adjustment of the cam the two indicators each register substantially at zero on the dial within the limits of visual observation.

2. A percentage scale having in combination a frame, a calibrated dial, a movable true-weight indicator registering on said dial, a movable percentage indicator to register on said dial a predetermined percentage of the registration of the true-weight indicator on said dial whereby said two indicators move apart as they progress upwardly along said calibrated dial, means compelling one of said indicators to move with the other, resilient means tending to draw said indicators to the same registering point, a cam having a contour and a position controlling the separation of the said two indicators, a cam-riding portion moved by the cam in one direction to separate said indicators against the force of said resilient means, said cam being adjustably movable about a pivotal axis fixed relative to said frame for setting the cam for different percentages of separation, said cam having its cam-ridden contour passing through its said pivotal axis, and said cam-riding portion at the zero position of the true-weight indicator having contact with said cam contour substantially at said pivotal axis, whereby at each position of adjustment of the cam the two indicators each register substantially at zero on the dial within the limits of visual observation.

3. In an indicating device having a frame, a dial, two indicators movable along said dial and having cam-controlled separation on said dial and no separation at a fixed point on said dial, a cam for controlling the separation of said indicators as they move along the dial, said cam having its camming contour lying in a plane and being adjustably positionable about an axis fixed relative to said frame and normal to said plane and passing through said camming contour, and a cam-riding element having contact with said contour substantially at said pivotal axis at the positions of said indicators having no separation on the dial, whereby at said positions of no separation angular adjustment of the cam is visually ineffective on the indicators.

ANDREW G. BROWN.

REFERENCES CITED

The following references are of record in the file of this patent:

UNITED STATES PATENTS

| Number | Name | Date |
|---|---|---|
| 1,887,845 | Mitchell | Nov. 15, 1932 |
| 2,157,705 | Jones | May 9, 1939 |
| 2,157,706 | Jones | May 9, 1939 |